United States Patent [19]

Mortensen

[11] Patent Number: 5,469,219
[45] Date of Patent: Nov. 21, 1995

[54] RF-BASED HIGH-BANDWIDTH SIGNAL TRANSMISSION METHOD AND APPARATUS

[75] Inventor: Keith Y. Mortensen, Brookfield, Conn.

[73] Assignee: Micrognosis, Inc., Danbury, Conn.

[21] Appl. No.: 123,897

[22] Filed: Sep. 20, 1993

[51] Int. Cl.⁶ ..................................................... H04N 7/08
[52] U.S. Cl. ............................................ 348/492; 348/488
[58] Field of Search .................................. 348/469, 488, 348/491, 492, 400

[56] References Cited

U.S. PATENT DOCUMENTS 2,580,903  1/1952  Evans ........................................ 348/492

Primary Examiner—Victor R. Kostak
Assistant Examiner—Nathan J. Flynn
Attorney, Agent, or Firm—Francis N. Carten

[57] ABSTRACT

A method and apparatus for signal transmission in which each of a series of input signals (e.g., RGB baseband video signals) is frequency-modulated onto an intermediate frequency. The intermediate frequency signals thus produced are then fed through RF mixers and frequency-shifted to an assigned transmission channel. Each channel is then RF multiplexed into a composite signal for providing a complete set of input signals to one or more monitors. Each monitor is provided with a splitter to divide the composite multiplexed signal into its RF components, which are fed to RF mixers to be shifted back to intermediate frequency signals. Demodulators convert these intermediate frequency signals to output signals corresponding to the input signals.

3 Claims, 1 Drawing Sheet

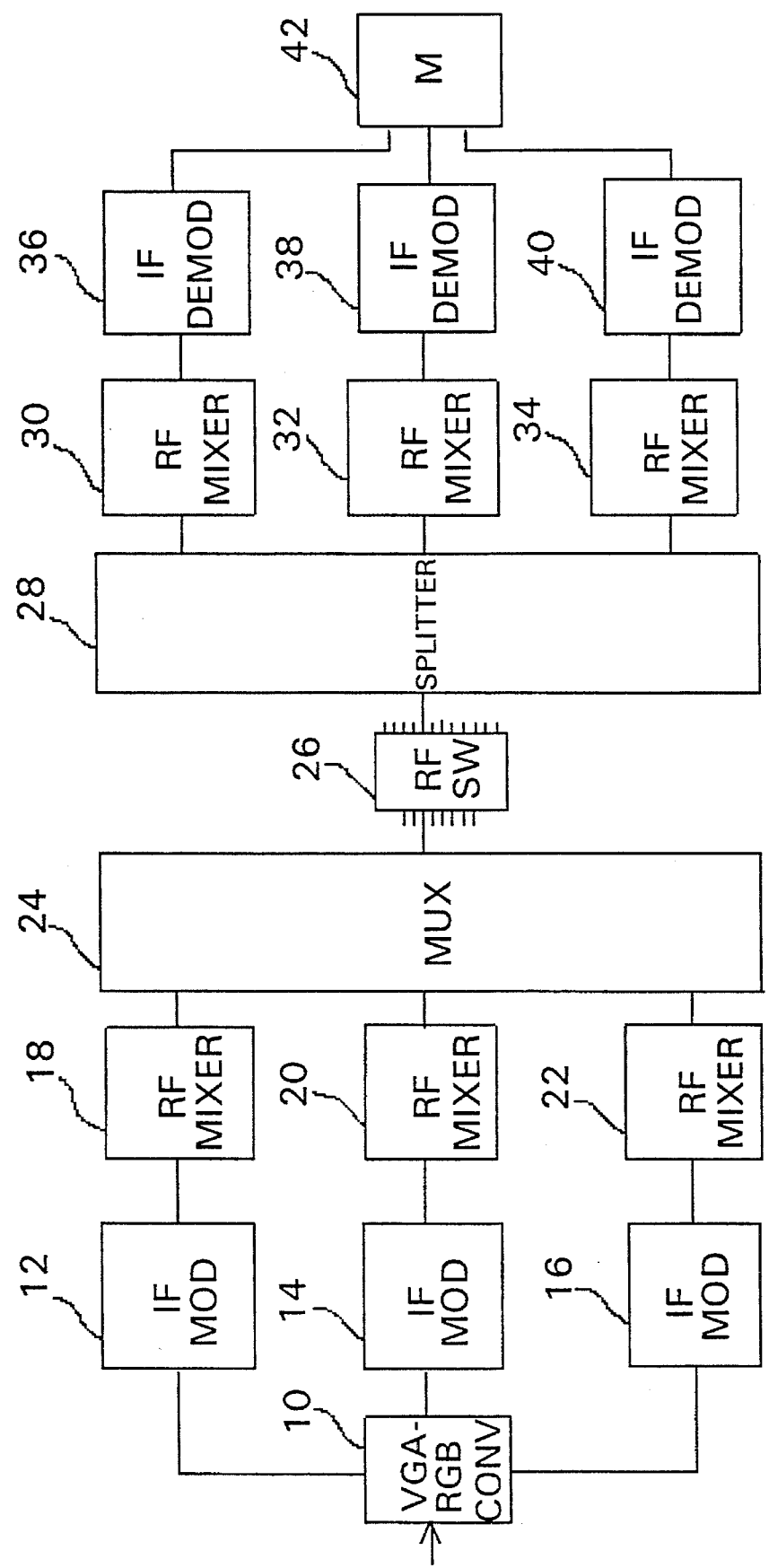

RF-BASED HIGH-BANDWIDTH SIGNAL TRANSMISSION METHOD AND APPARATUS

BACKGROUND OF THE INVENTION

In certain known video switching systems, low-bandwidth National Television Standard Code RGB (red-green-blue) video signals are typically multiplexed after one or two of the signals are phase shifted. Commercially available integrated circuits for performing this function have resolution bandwidths of only about 9 MHz, whereas computer-generated video bandwidths can exceed 100 MHz. Such bandwidth limitations, and the highly frequency-dependent nature of this method of signal processing, make this known technology unsuitable for many applications. The applicant has devised a novel method and apparatus for signal processing and transmission without these limitations, capable of operating with channel bandwidths up to 105 MHz.

SUMMARY OF THE INVENTION

The present invention is carried out by frequency-modulating each of a series of signals (e.g., RGB video signals) onto an intermediate frequency, which are then fed through RF mixers and frequency-shifted to an assigned transmission channel. The three channel signals are then combined into a composite signal for transmission through an RF switch to a monitor. Each monitor is provided with a splitter to divide the multiplexed signal into its component RF signals, RF mixers to shift these component RF signals to intermediate frequency signals, and demodulators to convert each of the intermediate frequency signals back to the original baseband signals.

DESCRIPTION OF THE DRAWINGS

The written description of the present invention will be more fully understood when read with reference to the accompanying drawing, which is a block diagram of a transmission system embodying the invention which performs applicant's novel method of signal transmission.

DETAILED DESCRIPTION OF THE PREFERRED EMBODIMENT

The best mode of carrying out the invention is shown in the aforementioned drawing and is described in detail hereunder. Referring now specifically to the drawing a VGA-RGB converter 10 receives computer VGA output and feeds the baseband RGB signals (including a synchronization signal) to intermediate-frequency modulators 12, 14 and 16, which in turn feed their modulated IF outputs to RF mixers 18, 20, and 22, respectively, to be frequency-shifted to separate radio-frequency channels. Each of the channel signals is fed into the combiner 24, which generates a multiplexed composite RF signal that is fed into an input terminal of RF switch 26. A single cable run from an output terminal of switch 26 carries the multiplexed composite RF signal to splitter 28, which separates the RF signals on each of the channels and feeds them to RF mixers 30, 32, and 34, which shift these component RF signals back to intermediate frequency signals. Demodulators 36, 38 and 40 convert each of the intermediate frequency signals from RF mixers 30, 32, and 34, respectively, back to the original baseband RGB signals, which are fed to an RGB monitor 42. Sample channel assignments for a VGA-type RGB system with a 25 MHz bandwidth are as follows:

| Channel | Intermediate Frequency |
| --- | --- |
| 1 - Red | 100 MHz |
| 2 - Green | 150 MHz |
| 3 - Blue | 200 MHz |

For a Sun workstation RGB system with a 100 MHz bandwidth, sample channel assignments are as follows:

| Channel | Intermediate Frequency |
| --- | --- |
| 1 - Red | 100 MHz |
| 2 - Green | 220 MHz |
| 3 - Blue | 340 MHz |

Applicant's method of signal transmission affords numerous advantages. Once the synchronization and baseband signals are modulated onto the frequency-modulated IF carrier, they become highly immune from degradation as a result of transmission, switching, amplification, and other signal handling. The fidelity of the signal on any given channel is dependent upon the modulator front end and the modulation, not upon the transmission medium or equipment. By multiplexing the RF carriers upon which the synchronization and baseband signals have been impressed, rather than multiplexing the synchronization and baseband signals themselves, a high degree of isolation—greater than 50 db—is provided between the baseband signals, greatly reducing crosstalk. A virtually transparent link is established between the signals' source and the monitor. Coaxial cable runs of 1000–2000 feet are possible, far exceeding the capabilities of existing baseband systems and, in many applications, eliminating the need for fiber optic transmission systems. Because the present invention uses only a single coaxial cable to carry multiple signals, substantial cost savings are realized in both new installations and in upgrades of existing installations.

The advantages of the present invention, as well as certain changes and modifications to the disclosed embodiment thereof, will be readily apparent to those skilled in the art. For example, by appropriate frequency assignment, multiple RGB signals could be RF multiplexed for transmission to different monitors on the same cable. Exemplary channel assignments for such a VGA-type RGB system with a 25 MHz bandwidth are:

| Channel | Intermediate Frequency |
| --- | --- |
| 1 - Red 1 | 100 MHz |
| 2 - Green 1 | 150 MHz |
| 3 - Blue 1 | 200 MHz |
| 4 - Red 2 | 250 MHz |
| 5 - Green 2 | 300 MHz |
| 6 - Blue 2 | 350 MHz |

Although the preferred embodiment is described above in the context of video signal transmission, undoubtedly other applications exist or will exist for applicant's invention. It is the applicant's intention to cover all those changes and modifications which could be made to the embodiment of the invention herein chosen for the purposes of the disclosure without departing from the spirit and scope of the invention.

I claim:

1. Signal transmission apparatus for video signals comprising:

1) means for frequency-modulating each of a plurality of baseband input signals to produce a plurality of intermediate frequency signals;
2) means for frequency-shifting each of said plurality of intermediate frequency signals to an assigned-bandwidth radio-frequency signal;
3) means for combining each of said radio-frequency signals to form a multiplexed composite radio-frequency signal;
4) means for transmitting said multiplexed composite radio-frequency signal;
5) means for splitting said multiplexed composite radio-frequency signal into its component radio-frequency signals;
6) means for frequency-shifting said radio-frequency signals to a plurality of intermediate frequency signals; and
7) means for demodulating each of said intermediate frequency signals to produce baseband output signals corresponding to said baseband input signals.

2. Signal transmission apparatus according to claim 1, wherein said input signals comprise red, green and blue video signals.

3. Signal transmission apparatus according to claim 2, wherein a synchronization signal is incorporated into one of said input signals.

* * * * *